(12) United States Patent
Cernohous et al.

(10) Patent No.: US 11,077,597 B2
(45) Date of Patent: Aug. 3, 2021

(54) COMPOSITIONS AND METHODS FOR REDUCING THE SURFACE TEMPERATURE OF COMPOSITE ARTICLES

(71) Applicant: ADVANCED ENVIRONMENTAL RECYCLING TECHNOLOGIES, INC., Springdale, AR (US)

(72) Inventors: Jeffrey J. Cernohous, Hudson, WI (US); Gary Hobbs, Springdale, AR (US); Dustin L. Mackey, Buchanan, TN (US); Timothy D. Morrison, Springdale, AR (US)

(73) Assignee: MOISTURESHIELD, INC., Springdale, AR (US)

( * ) Notice: Subject to any disclaimer, the term of this patent is extended or adjusted under 35 U.S.C. 154(b) by 181 days.

(21) Appl. No.: 16/079,013

(22) PCT Filed: Feb. 23, 2017

(86) PCT No.: PCT/US2017/019155
§ 371 (c)(1),
(2) Date: Aug. 22, 2018

(87) PCT Pub. No.: WO2017/147311
PCT Pub. Date: Aug. 31, 2017

(65) Prior Publication Data
US 2019/0047200 A1     Feb. 14, 2019

Related U.S. Application Data

(60) Provisional application No. 62/298,785, filed on Feb. 23, 2016.

(51) Int. Cl.
*C08K 3/013*     (2018.01)
*C08K 3/38*      (2006.01)
(Continued)

(52) U.S. Cl.
CPC .......... *B29C 48/155* (2019.02); *B29C 48/022* (2019.02); *B29C 48/16* (2019.02);
(Continued)

(58) Field of Classification Search
CPC ....................................................... C08K 3/38
See application file for complete search history.

(56) References Cited

U.S. PATENT DOCUMENTS 6,616,744 B1   9/2003   Sainz et al.
6,989,056 B2   1/2006   Babler
(Continued)

FOREIGN PATENT DOCUMENTS

CN   104004310 A   8/2014
EP    2551929 A1   1/2013
(Continued)

OTHER PUBLICATIONS

Machine translation of CN 104004310 (Year: 2014).*
(Continued)

*Primary Examiner* — Ian A Rummel
(74) *Attorney, Agent, or Firm* — Merchant & Gould P.C.

(57) ABSTRACT

A composition includes an infrared reflective additive having one or more infrared reflective colorants and a thermally emissive filler. The infrared reflective additive can be melt processed in a polymeric matrix.

18 Claims, 3 Drawing Sheets

(51) Int. Cl.
*C08J 3/20* (2006.01)
*B29C 48/155* (2019.01)
*B29C 48/00* (2019.01)
*B29C 48/16* (2019.01)
*C08K 5/00* (2006.01)
*C08L 101/00* (2006.01)
*B32B 27/18* (2006.01)
*B29K 105/00* (2006.01)
*B29K 509/04* (2006.01)
*B29K 711/14* (2006.01)

(52) U.S. Cl.
CPC ............... *B32B 27/18* (2013.01); *C08J 3/201* (2013.01); *C08K 3/013* (2018.01); *C08K 3/38* (2013.01); *C08K 5/0041* (2013.01); *C08L 101/00* (2013.01); *B29K 2105/0032* (2013.01); *B29K 2509/04* (2013.01); *B29K 2711/14* (2013.01); *B29K 2995/0012* (2013.01); *C08J 2323/06* (2013.01); *C08K 2003/385* (2013.01); *C08K 2201/001* (2013.01)

(56) References Cited

U.S. PATENT DOCUMENTS

| | | | |
|---|---|---|---|
| 7,157,112 | B2 | 1/2007 | Haines |
| 2003/0096094 | A1* | 5/2003 | Hayduke .............. B32B 27/08 428/292.4 |
| 2005/0064094 | A1 | 3/2005 | Wojtysiak et al. |
| 2005/0070640 | A1 | 3/2005 | Babler |
| 2006/0255496 | A1 | 11/2006 | Wells |
| 2013/0030105 | A1 | 1/2013 | Shimokoba et al. |
| 2014/0080951 | A1 | 3/2014 | Raman et al. |
| 2014/0335329 | A1 | 11/2014 | Abayasinghe et al. |
| 2015/0111014 | A1 | 4/2015 | Crabb et al. |
| 2016/0053075 | A1 | 2/2016 | Cernohous |
| 2016/0145411 | A1* | 5/2016 | Uibel .................. C08K 9/02 524/404 |

FOREIGN PATENT DOCUMENTS

| | | |
|---|---|---|
| JP | H02-092530 A | 4/1990 |
| KR | 20090088134 A | 8/2009 |
| WO | 2015/175206 A1 | 11/2015 |
| WO | 2017221102 A1 | 12/2017 |

OTHER PUBLICATIONS

International Search Report and Written Opinion of the International Searching Authority for International Patent Application No. PCT/US2017/019155 dated Jun. 1, 2017, 11 pages.

Extended European Search Report for Application No. 17757220.3 dated Jan. 21, 2020, 9 pages.

* cited by examiner

COMPOSITIONS AND METHODS FOR REDUCING THE SURFACE TEMPERATURE OF COMPOSITE ARTICLES

RELATED APPLICATIONS

This application is a National Stage Application of PCT/US2017/019155 filed Feb. 23, 2017, which claims the benefit of U.S. Provisional Application No. 62/298,785 filed Feb. 23, 2016, the entire disclosures of which are hereby incorporated by reference. To the extent appropriate, a claim of priority is made to each of the above disclosed applications.

FIELD

This disclosure relates to compositions and methods for reducing the surface temperatures of composites.

BACKGROUND

Wood plastic composites (WPCs) have recently found application in many commercial products. The overall market for WPCs was estimated to total billions of pounds annually. The leading uses for WPCs are found in construction markets (e.g., as decking) and automotive markets (e.g., as interior trim). When compared to conventional mineral or glass filled composites, WPCs have lower specific gravity, better strength/weight ratio and are often more cost effective. They also can have the look of natural wood, while being much easier to maintain.

WPCs and the application thereof, however, are not without certain drawbacks. WPCs have had issues with exposure to ultraviolet radiation, mold, and mildew growth. As a result, many companies have commercialized decking products that have a thin, coextruded capstock layer. This layer often contains additives to impart improved ultraviolet stability and microbial resistance. The industry has also developed capstocks with enhanced aesthetics, such as the appearance of dark, tropical hardwoods. For example, several decking manufacturers offer capped products that mimic the colors of the natural Brazilian Cherry, Ipe, or Rosewood. These dark colored capped deck boards have an undesirable side effect in that they can become extremely hot to the touch when exposed to warm, sunny climates. In some instances, surface temperatures of capped composite decking products may exceed 170° F. (about 77° C.). This makes the deck not only uncomfortable to the touch, but it also raises the local ambient temperature around the deck dramatically, making it difficult to enjoy the deck. In addition, the higher the surface temperature of an exterior decking/building product, the more rapidly deleterious chemical reactions occur. This includes the breakdown of the polymeric capstock by oxidation and ultraviolet energy.

From the foregoing, it will be appreciated that it is desirable to lower the surface temperature, especially with darker colored capstocks, to prolong the life and improve the acceptability of composite articles.

SUMMARY

In one aspect, an additive package, when incorporated into a polymeric matrix, is capable of reducing the thermal loading characteristics of polymeric composites. In certain embodiments, the infrared reflective additive comprises one or more infrared reflective colorants and a thermally emissive filler. The infrared reflective additive can be compounded with conventional polymers to form articles, including for example, a capstock layer for decking products. The combination of one or more infrared reflective colorants and a thermally emissive filler in a polymeric composite may dramatically reduce the heat build-up that occurs in conventional composite materials when exposed to infrared radiation.

The disclosed infrared reflective additive compositions can reduce the surface temperatures of composite substrates. In one embodiment, the infrared reflective additive composition of this disclosure is compounded into a polymeric matrix using melt processing techniques. In an embodiment, the additive composition includes one or more infrared reflective colorants, and one or more thermally emissive fillers.

The development of a polymeric composite employing a combination of thermally emissive compounds with highly reflective colorants can permit the formation of composite materials having aesthetically desirable hues, including dark hues. The resulting composites may, in certain applications, possess surface temperatures and heat build-up values closely resembling those of composites containing a significant amount of white colorant. CIE L*a*b* color scale coordinates represent one method for determining the color of an article. The disclosed embodiments include composites whose L* values represent darker values, e.g., below about 50, and which are capable of achieving desirable surface temperatures and reductions in heat build-up compared to conventional materials with similar L* values. Additionally, lighter colored embodiments can also exhibit a reduction in heat build-up and reduced surface temperatures.

Infrared reflective colorants can reflect light in the 700-2,500 nm wavelength range. Exemplary infrared reflective dark colorants can be inorganic or organic in nature, and include but are not limited to those referred to in U.S. Pat. Nos. 6,458,848 B2, 6,616,744 B1, 6,989,056 B2 and 7,157,112 B2. Exemplary inorganic compounds include single or mixed metal oxides formed from a variety of metals, e.g., from aluminum, antimony, bismuth, boron, chromium, cobalt, gallium, indium, iron, lanthanum, 15 lithium, magnesium, manganese, molybdenum, neodymium, nickel, niobium, silicon, tin, vanadium or zinc. Exemplary metal oxides include $Cr_2O_3$, $Al_2O_3$, $V_2O_3$, $Ga_2O_3$, $Fe_2O_3$, $Mn_2O_3$, $Ti_2O_3$, $In_2O_3$, $TiBO_3$, $NiTiO_3$, $MgTiO_3$, $CoTiO_3$, $ZnTiO_3$, $FeTiO_3$, $MnTiO_3$, $CrBO_3$, $NiCrO_3$, $FeBO_3$, $FeMoO_3$, $FeSn(BO_3)_2$, $BiFeO_3$, $AlBO_3$, $Mg_3Al_2Si_3O_{12}$, $NdAlO_3$, $LaAlO_3$, $MnSnO_3$, $LiNbO_3$, $LaCoO_3$, $MgSiO_3$, $ZnSiO_3$ and $Mn(Sb,Fe)O_3$.

A thermally emissive filler can be employed to reduce surface temperatures and heat build-up. A non-limiting example of thermally emissive filler includes boron nitride. The combination of an infrared reflective colorant and a thermally emissive filler in a polymeric can provide improved reduction in surface temperatures as well as a reduction in heat build-up within the article. The infrared additive composition of this disclosure may optionally include other infrared transparent colorants.

In an embodiment, the resulting polymeric composition may be used in various articles that are exposed to infrared radiation, such as building products. For example, the disclosed composition may be employed as an extrudable capstock particularly useful for WPCs. In another embodiment, the additive compositions of this disclosure are formulated into a paint or coating composition that can be applied to a substrate. In another embodiment, the additive composition is within a polymeric matrix capable of being extruded into a film or a fiber. The infrared reflective additive compositions of this disclosure are particularly useful at reducing the surface temperature of composite building articles when they are exposed to infrared radiation. In one embodiment, the surface temperature of a composite building article capped with the capstock containing the colorant formulations of this disclosure have surface temperatures (OIR) that are as much as 50° F. (about 10° C.) lower than conventional capstock articles having similar coloration according to CIE L*a*b* color scale coordinates.

The disclosed infrared reflective additive composition embodied can be compounded into any polymeric matrix to form a polymeric composite with the enhanced reduction in thermal properties. In some embodiments, the polymeric matrix is melt processable. In additional embodiments, the polymeric matrix is crosslinkable after it is melt processed. Crosslinkable polymers may provide adhesion to a WPC core in capstock applications. In other embodiments, the polymeric matrix is a thermoset.

In another embodiment, the IR reflective additive composition may also contain additives or colorants that reflect ultraviolet and visible light, typically characterized as having wavelengths between 200-400 and 400-700 nm, respectively.

The additive compositions of this disclosure have broad utility for reducing surface temperatures in a wide variety of building and construction articles including, but not limited to, the following: decking, fencing, railing, roofing and siding. It is also contemplated that the utility of the additive compositions of this disclosure may be utilized in films and fibers for utility in packaging, protective films and textiles.

DETAILED DESCRIPTION

Figure 1:
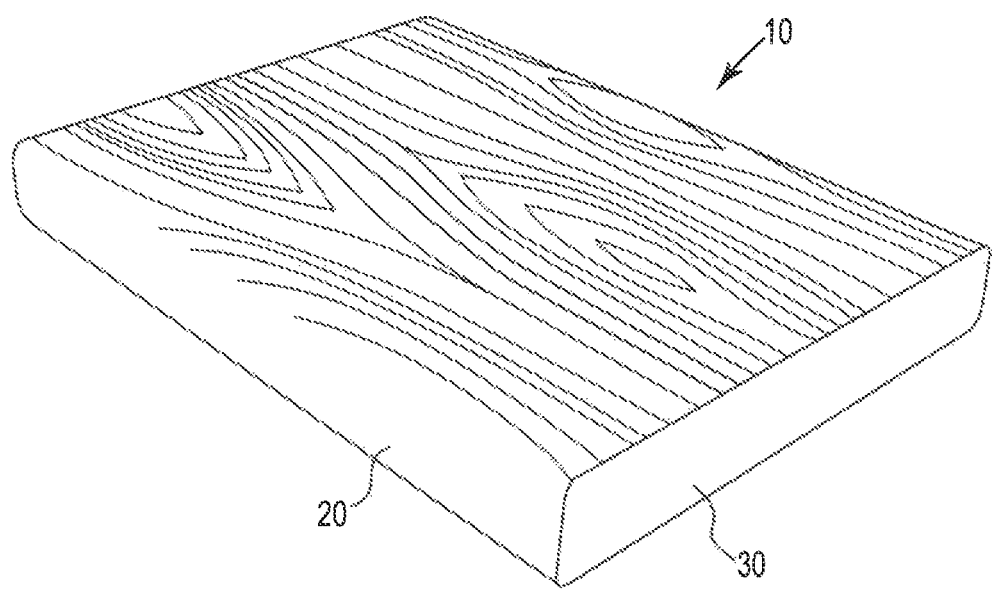
FIG. 1 is an isometric view of an article formed utilizing an embodiment of the disclosure.

The following detailed description describes certain embodiments and is not to be taken in a limited sense. Unless the context indicates otherwise the following terms shall have the following meaning and shall be applicable to the singular and plural:

The terms "a," "an," "the," "at least one," and "one or more" are used interchangeably. Thus, for example, a composition containing "an" infrared reflective additive means that the composition may include "one or more" infrared reflective additives.

The term "composite" means a material comprising two or more chemically and physically different phases separated by a distinct interface.

The term "crosslinkable polymer" means a melt processable polymeric material or composite that can be crosslinked upon exposure to moisture, heat, or actinic radiation after melt processing.

The term "filler" means a material added to adjust the mechanical or thermal properties of a polymer or polymeric material.

The term "infrared reflective additive" means an additive composition that has the ability to reflect infrared radiation and beneficially improve the thermal characteristics of a polymeric composite.

The term "infrared reflective colorant" means a dye or colorant that reflects infrared radiation, typically greater than 30%.

The term "infrared transparent colorant" means a dye or colorant that has a high degree (>30%) of infrared transparency.

The term "melt processable composition" means a formulation that is processed, typically at elevated temperatures near or exceeding the melting point of softening point of at least one component of the formulation, using a polymer melt processing technique.

The term "melt processing technique" means a technique for applying thermal and mechanical energy to process a polymer or composition. Examples include extrusion, injection molding, blow molding, rotomolding, or batch mixing.

The terms "polymer" and "polymeric" mean a molecule of high relative molecular mass, the structure of which essentially contains multiple repetitions of units derived, actually or conceptually, from molecules of low relative molecular mass.

The term "polymeric matrix" means a melt processable, thermoplastic polymeric material or materials.

The terms "preferred" and "preferably" refer to embodiments that may afford certain benefits, under certain circumstances. Other embodiments, however, may also be preferred, under the same or other circumstances. Furthermore, the recitation of one or more preferred embodiments does not imply that other embodiments are not useful, and is not intended to exclude other embodiments from the claimed scope.

The term "thermally emissive filler" means a minimally pigmentary compound capable of reflecting infrared radiation and conducting heat away from a surface.

The terms "wood polymer composite" and "WPC" mean a composite containing a cellulosic material as a filler.

The recitation of numerical ranges using endpoints includes all numbers subsumed within that range (e.g. 1 to 5 includes 1, 1.5, 3, 3.95, 4.2, 5, etc.).

The infrared reflective additives of this invention are compounded into a polymeric matrix and converted into a polymeric composite through melt processing techniques. The polymeric composite can be formed or made into various articles. For example, FIG. 1 depicts decking board 10 having infrared reflective capstock 20 over WPC 30. Capstock 20 is produced by coextruding a polymeric matrix containing the infrared reflective additive of this disclosure onto a wood plastic composite substrate using melt processing techniques. Capstock 20 comprises a thermoplastic polymer, such as a polyolefin. In an alternative embodiment, capstock 20 further comprises a crosslinkable polymer. The resulting article exhibits the beneficial thermal reduction properties set forth in this disclosure.

Infrared reflective additives comprise a mixture of one or more infrared reflective colorants and one or more thermally emissive fillers. An infrared reflective additive is a composition that has the ability to reflect infrared radiation and beneficially improve the thermal characteristics of a polymeric composite. An infrared reflective additive can be included in the polymeric matrix at amounts ranging from about 0.05 wt % to about 85 wt %. In other embodiments, the additive is included in the polymeric matrix at levels of 0.5 to 20 wt %, or 0.25 to 10 wt %. In certain embodiments, the infrared reflective additive substantially lowers the temperature of the surface exposed to the infrared radiation over polymeric composites without the additive. The combination of components in the additive is well suited to enhance the thermal characteristics of articles, particularly darker shaded or colored articles that are susceptible to heat build-up due in part to infrared radiation.

The disclosed infrared reflective colorants useful in achieving the desired thermal properties include those colorants that inherently have a high level of infrared reflectivity. A high level of infrared reflectivity includes those colorants that reflect greater than 25%, greater than 30%, greater than 50%, greater than 75% or in some cases greater than 90% of infrared radiation. Non-limiting examples include those colorants commercially marketed under the Artic tradename by Shepherd Colors Company, West Chester, Ohio. Those skilled in the art will recognize that the level of infrared reflectivity is related to the inherent properties of the colorant (e.g., brightness or L*). Generally, the lower the brightness of the colorant, the lower the level of IR reflectivity.

A thermally emissive filler can be employed to reduce surface temperature and heat buildup. A non-limiting example of a thermally emissive filler includes boron nitride. In one embodiment, the addition of boron nitride to the additive formulation in combination with the infrared reflective colorants results in a sharp reduction in heat build-up on the surface of a polymeric composite.

In a further embodiment, the infrared reflective additive may include a transparent colorant. Transparent colorants can offer the ability to adjust the color of a polymeric composite to a desired hue without adversely impacting the thermal characteristics created by the use of the infrared reflective additive. Exemplary infrared transparent colorants include colorants that have a high level of infrared transparency. Non-limiting examples include organic colorants commercially marketed under the Lumogen™ trademark by BASF Corporation, Florham Park, N.J. These colorants are useful in that they are very dark and can be utilized to modify the color of the resulting polymeric matrix while not absorbing infrared radiation. This is in contrast to colorants like carbon black, which has extremely high infrared absorption characteristics and can cause the polymeric matrix to absorb extensive heat at the surface.

In another embodiment, the infrared reflective additive composition may further include additives that additionally reflect solar radiation. Non-limiting examples of additives that reflect ultraviolet and visible light include titanium dioxide, zirconium dioxide, including nanoparticulate titanium and zirconium dioxide. Nanoparticulate particles are characterized as particles that have an average diameter of less than one micron.

The polymeric matrix employing the infrared reflective additive may include one or more polymers. Non-limiting examples of polymers useful with the additive of this disclosure include high density polyethylene (HDPE), low density polyethylene (LDPE), linear low density polyethylene (LLDPE), functional polyolefin copolymers including polyolefin based ionomers, polypropylene (PP), polyolefin copolymers (e.g., ethylene-butene, ethylene-octene, ethylene vinyl alcohol), polystyrene, polystyrene copolymers (e.g., high impact polystyrene, acrylonitrile butadiene styrene copolymer), polyacrylates, polymethacrylates, polyesters, polyvinylchloride (PVC), fluoropolymers, polyamides, polyether imides, polyphenylene sulfides, polysulfones, polyacetals, polycarbonates, polyphenylene oxides, polyurethanes, thermoplastic elastomers (e.g., SIS, SEBS, SBS), epoxies, alkyds, melamines, phenolics, ureas, vinyl esters or combinations thereof. In some embodiments, polyolefins represent preferred polymers for use in polymeric matricies, for example in articles such as WPC capstock formulations.

In another aspect, the polymeric matrix may contain other additives in addition to an infrared reflecting additive. Non-limiting examples of such additives include antioxidants, light stabilizers, fibers, blowing agents, foaming additives, antiblocking agents, heat stabilizers, impact modifiers, biocides, antimicrobial additives, compatibilizers, plasticizers, tackifiers, processing aids, lubricants, coupling agents, and flame retardants. Such additives may be incorporated into the melt processable composition in the form of powders, pellets, granules, or in any other extrudable form. The amount and type of such additives in the melt processable composition may vary depending upon the polymeric matrix and the desired physical properties of the finished composition. Those skilled in the art of melt processing are capable of selecting appropriate amounts and types of additives to match with specific polymeric matrices in order to achieve desired physical properties of the finished material.

In one aspect, the polymeric matrix may comprise a crosslinkable polymer. Crosslinkable polyolefin polymers are just one example of materials suitable for such an application. Non-limiting examples of crosslinkable polyolefins include silane grafted polyethylene, silane grafted polyethylene copolymers (e.g., ethylene/hexane, ethylene/octane, ethylene/vinyl acetate, ethylene/acrylate, ethylene/propylene) and silane grafted polypropylene. Silanes moieties grafted to the polymer backbone may include, for example, trimethoxy or triethoxy silane.

Crosslinkable polymers can be produced in any manner known in the art, including reactive extrusion. In reactive extrusion, the base polymer is reacted with an ethylenically unsaturated crosslinkable monomer in the presence of a free radical initiator. In one embodiment, ethylencially unsaturated alkoxy silane monomers can be reacted with a base polymer in the presence of a free radical initiator. Additionally, in certain applications, vinyl trialkoxy silanes may be used as the ethylenically unsaturated crosslinkable monomer.

A variety of crosslinking mechanisms may be employed. In one exemplary embodiment, the crosslinking mechanism employs an activated free-radical initiation. Non-limiting free radical initiators are any of those known in the art including diazo compounds and peroxy compounds. Those skilled in the art will based on this disclosure be able to select an appropriate free radical initiator, as determined for example by the melt processing conditions (e.g., temperature and residence time) required to facilitate effective grafting of the crosslinkable monomer to the polymer backbone. The crosslinking reaction can be optionally accelerated by including a catalyst in the capstock formulation. Catalysts useful for improving the kinetics of moisture cure crosslinking processes can be any of those known in the art.

The amount of crosslinkable monomer in the crosslinkable polymer composition can vary. In one embodiment, the crosslinkable monomer comprises 0.05 to 20 wt % of the crosslinkable polymer composition, 0.1 to 10 wt % of the crosslinkable polymer composition, or in certain aspects 0.25 to 5 wt % of the crosslinkable polymer composition.

For end use applications where the polymeric composite is forming a capstock on a WPC, the amount of crosslinkable polymer in the capstock composition can also vary. In one embodiment, the capstock composition comprises at least 1 of the crosslinkable polymer, 5 to 95 wt % of the crosslinkable polymer, or in certain applications 10 to 75 wt % of the crosslinkable polymer.

The crosslinking reaction is generally activated upon or soon after forming the desired article, in a post-crosslinking reaction. In one embodiment, the post-crosslinking reaction is activated by moisture curing. In another embodiment, the post crosslinking reaction is activated by exposure to actinic radiation, for example, ultraviolet or electron beam radiation.

In an alternative embodiment, it may become desirable to adjust mechanical or thermal properties of the end use article resulting from the use of the infrared reflective additive of this disclosure. In that regard, the melt processable composition may also contain fillers. Fillers can be used to make a variety of composites, and, for the purposes of this disclosure, will be described in connection with the extrusion of a composite capstock atop a WPC. Fillers can function to improve mechanical and thermal properties of the capstock. Fillers can also be utilized to reduce coefficient of thermal expansion (CTE) of the capstock, in order to minimize the difference in CTE between the capstock and the WPC core. Non-limiting examples of fillers include mineral and organic fillers (e.g., talc, mica, clay, silica, alumina, carbon fiber, carbon black glass fiber) and conventional cellulosic materials (e.g., wood flour, wood fibers, sawdust, wood shavings, newsprint, paper, flax, hemp, wheat straw, rice hulls, kenaf, jute, sisal, peanut shells, soy hulls, or other cellulose containing materials). Fillers such as calcium carbonate, talc, clay and cellulosic fiber may be preferred for many applications. The amount of filler in the melt processable composition may vary depending upon the polymeric matrix and the desired physical properties of the finished composition. In some embodiments, the filler comprises 1-90 wt % of the capstock formulation, 5-75 wt % of the capstock formulations or 10-60 wt % of the capstock formulation.

The infrared reflective additive composition and optional additives can be prepared by blending the components into a polymeric matrix. Depending on the type and nature of polymeric matrix, this can be done using a variety of mixing processes known to those skilled in the art. For liquid thermoset polymeric matricies, the infrared reflective additive composition can be blended in standard mixers utilized to blend liquid resins and additives or colorants. For melt processable thermoplastic compositions, the polymer matrix and infrared reflective additive can be combined together by any of a variety of blending devices available in the plastics industry, such as with a compounding mill, a Banbury mixer, or a mixing extruder. Materials for making a polymeric matrix may be used in the form, for example, of a powder, a pellet, or a granular product. The mixing operation is most conveniently carried out at a temperature above the melting point or softening point of the polymer. The resulting melt blended mixture can be either extruded directly into the form of the final product shape or pelletized or otherwise comminuted into a desired particulate size or size distribution and fed to an extruder (e.g., a twin-screw extruder) that melt processes the blended mixture to form the final product shape. Alternatively, the infrared reflective additive composition may be produced by dry blending a masterbatch of the additives and filler with the polymeric matrix and directly extruding this composition onto an article.

The infrared reflective additive compositions of this disclosure have broad utility for reducing the surface temperature in a wide variety of articles including those in the building and construction markets. Non-limiting examples of potential uses of the additive and polymeric composite of this disclosure include: decking, fencing, railing, roofing and siding. It is also contemplated that the utility of the additive compositions of this disclosure to be utilized in films and fibers for utility in packaging, protective films and textiles.

The compositions of this disclosure are well suited for capstock applications. In such applications, a WPC core is surrounded on at least a portion of its periphery by a capstock derived from the composition of this disclosure. The WPC is typically comprised of a polymeric matrix and a cellulosic filler. In one embodiment the filler is a cellulosic material, such as for example, wood flour.

The polymeric matrix of the wood plastic composite core functions as the host polymer and is a primary component of the melt processable composition. A wide variety of polymers conventionally recognized in the art as suitable for melt processing are useful as the polymeric matrix of the WPC. They include both hydrocarbon and non-hydrocarbon polymers. Examples of useful polymeric matrices include, but are not limited to, polyamides, polyimides, polyurethanes, polyolefins, polystyrenes, polyesters, polycarbonates, polyketones, polyureas, polyvinyl resins, polyacrylates and polymethylacrylates.

In some embodiments, the polymeric matrix of the WPC core may include blended polymers. Non-limiting examples of polymers for blending include, high density polyethylene (HDPE), low density polyethylene (LDPE), linear low density polyethylene (LLDPE), polypropylene (PP), polyolefin copolymers (e.g., ethylene-butene, ethylene-octene, ethylene vinyl alcohol), functionalized polyolefins (e.g. polyolefin based ionomers) polystyrene, polystyrene copolymers (e.g., high impact polystyrene, acrylonitrile butadiene styrene copolymer), polyacrylates, polymethacrylates, polyesters, polyvinylchloride (PVC), fluoropolymers, polyamides, polyether imides, polyphenylene sulfides, polysulfones, polyacetals, polycarbonates, polyphenylene oxides, polyurethanes, thermoplastic elastomers (e.g., SIS, SEBS, SBS), epoxies, alkyds, melamines, phenolics, ureas, vinyl esters or combinations thereof. An exemplary blend suitable for polymeric matrices is polyolefins and thermoplastic elastomers.

Non-limiting examples of fillers for the WPC include inorganic and organic fillers (e.g., talc, mica, clay, silica, alumina, carbon fiber, carbon black glass fiber) and cellulosic materials (e.g., wood flour, wood fibers, sawdust, wood shavings, newsprint, paper, flax, hemp, wheat straw, rice hulls, kenaf, jute, sisal, peanut shells, soy hulls, or any cellulose containing material). In another aspect, polymeric fibers may also be incorporated in the composite of this disclosure. The amount of filler in the melt processable wood plastic composite core composition may vary depending upon the polymeric matrix and the desired physical properties of the finished composition. Those skilled in the art of melt processing polymers will be capable of selecting appropriate amounts and types of fillers to match a specific polymeric matrix.

The amount of the filler in the melt processable WPC may vary depending upon the polymeric matrix and the desired physical properties of the finished composition. In view of the present disclosure, the selection of an appropriate amount and type of filler(s) can be made to match with a specific polymeric matrix in order to achieve desired physical properties of the finished material. Typically, the filler may be incorporated into the melt processable composition in amounts up to about 90% by weight. The filler is generally added to the melt processable composite composition at levels between 5 and 90%, between 15 and 80%, or between 25 and 70% by weight of the formulation. Additionally, the filler may be provided in various forms depending on the specific polymeric matrices and end use applications. Non-limiting examples of filler form include, powder and pellets.

In another aspect, the melt processable wood plastic composite core composition may contain other additives. Non-limiting examples of conventional additives include antioxidants, light stabilizers, fibers, blowing agents, foaming additives, antiblocking agents, heat stabilizers, impact modifiers, biocides, compatibilizers, flame retardants, plasticizers, tackifiers, colorants, processing aids, lubricants, coupling agents, and colorants. The additives may be incorporated into the melt processable composition in the form of powders, pellets, granules, or in any other extrudable form. The amount and type of conventional additives in the melt processable composition may vary depending upon the polymeric matrix and the desired physical properties of the finished composition. Those skilled in the art of melt processing are capable of selecting appropriate amounts and types of additives to match with specific polymeric matrices in order to achieve desired physical properties of the finished material.

Melt processing of the WPC and capstock are typically performed at a temperature from 80° to 300° C., although optimum operating temperatures are selected depending upon the melting point, melt viscosity, and thermal stability of the composition. Different types of melt processing equipment, such as extruders, may be used to process the melt processable compositions of this disclosure.

Embodiments employing a crosslinkable capstock may be subjected to post product crosslinking. Such post production crosslinking of the extrudable capstock composition can be performed by exposure to moisture, thermal energy or actinic radiation depending on the specific capstock chemistry being utilized. In one embodiment, a silane grafted polymer is extruded as a capstock onto a WPC core and post crosslinked by exposure to moisture just after the coextrusion die. This crosslinking reaction can be optionally accelerated by including a catalyst in the capstock formulation. Catalysts useful for improving the kinetics of moisture cure crosslinking processes can be any of those known in the art.

The composites of this disclosure are suitable for manufacturing articles, including those in the building and construction industries. For example, articles incorporating the compositions of this disclosure may include: building components such as decking, siding, roofing, railing and fencing. The infrared reflective additive of this disclosure also has potential utility in coatings, paints, films and fibers, protective films and textiles.

The resulting articles produced by melt processing the inventive composition can provide improved characteristics. For example, wood plastic composites extruded with the capstocks containing the infrared reflective additive of this disclosure have markedly lower heat buildup upon exposure to infrared radiation.

Articles produced with the infrared reflective additive of this disclosure demonstrate the one or more of reduced thermal or lower surface temperatures when compared to comparable articles produced without the additive. The CIE L*a*b* color scale coordinates represent one method for determining the color of an article. The infrared reflective additive of this disclosure may favorably impact the thermal characteristics of a composite possessing any selected color in the CIE L*a*b* color scale range and demonstrate an improvement over similar colored composites without the infrared reflective additive.

Various embodiments in this disclosure with L* values in the darker range, or below 50, are capable of achieving very desirable surface temperatures and drastic reductions in heat build-up compared to conventional materials with similar L* values. Articles with comparable L* values possess much higher outdoor heat buildup values than articles incorporating the additive of this disclosure. For example, an article produced in accordance of this disclosure may exhibit an outdoor heat build-up value more than 10° F. (about −12° C.), 20° F. (about −7° C.) or 30° F. (about −1° C.) lower than an article with a comparable L* value.

Additionally, capstock formulations contemplated by this disclosure may have surface temperatures that are as much as 50° F. (about −10° C.) lower than conventional capstock articles having similar coloration according to CIE L*a*b* color scale coordinates.

EXAMPLES

TABLE 1

MATERIALS

| Material | Supplier |
|---|---|
| HDPE | Bapolene 2035, commercially available from Bamberger Polymers, Inc, New York, NY |
| ITC | Infrared transparent color, Lumogen FK4280, commercially available from BASF Corporation, Florham Park, NJ |
| IRC1 | Infrared reflective color, Artic Orange 10C341, commercially available from Shepherd Color Company, West Chester, OH |
| IRC2 | Infrared reflective color, Yellow 20P296, commercially available from Shepherd Color Company, West Chester, OH |
| IRC3 | Infrared reflective color, Sicopal Black, commercially available from BASF Corporation, Florham Park, NJ |
| TEF | Thermally emissive filler, Boron nitride, 1022X, commercially available from Momentive Inc., Waterford, NY |
| DC | Dark color, Walnut Colorant, commercially available from Mosaic Color and Additive, Greenville, SC |
| WC1 | White color, TiO$_2$, Altris 800, commercially available from Huntsman, Inc, Woodlands, TX |
| WC2 | White color, TiO$_2$, R902, commercially available from The Chemours Company, Wilmington, DE |
| BC | Black Colorant, Vulcan XC72, commercially available from Cabot Corp. Alpharetta, GA |

TABLE 2

EXPERIMENTAL FORMULATIONS

| Example | HDPE | IRC1 | IRC2 | IRC3 | ITC | TEF | DC | WC1 | WC2 | BC |
|---|---|---|---|---|---|---|---|---|---|---|
| CE1 | 95.5 | | | .5 | | | | 4 | | |
| CE2 | 95.5 | | | | .5 | | | 4 | | |
| CE3 | 97.75 | | 2 | | .25 | | | | | |
| CE4 | 96 | | | | | | | | 4 | |
| CE5 | 98 | | | | | | 2 | | | |
| CE6 | | | | | | | | | | 2 |
| 1 | 91.5 | | | .5 | | 4 | | 4 | | |
| 2 | 87.5 | | | .5 | | 8 | | 4 | | |
| 3 | 91.5 | | | | .5 | 4 | | 4 | | |

TABLE 2-continued

EXPERIMENTAL FORMULATIONS

| Example | HDPE | IRC1 | IRC2 | IRC3 | ITC | TEF | DC | WC1 | WC2 | BC |
|---|---|---|---|---|---|---|---|---|---|---|
| 4 | 87.5 | | | | .5 | 8 | | 4 | | |
| 5 | 93.75 | | 2 | | .25 | 4 | | | | |
| 6 | 81.75 | | 2 | | .25 | 16 | | | | |
| 7 | 86.5 | 5 | | | .5 | 8 | | | | |
| 8 | 86 | 5 | | | 1 | 8 | | | | |

Sample Preparation

HDPE and colorants were dry blended in a plastic bag and gravimetrically fed into a 11 mm twin screw extruder (commercially available from Thermo Scientific, 40:1 L:D). The compounding was performed at a 190° C. flat temperature profile for all zones except that the die temperature was 180° C. The compounds were extruded into strands and pelletized into pellets approximately 1-2 mm in length. The resulting compound was compression molded into 0.125 mm×10 cm×10 cm plaques using a laboratory hot press (commercially available from Carver Inc.) at 180° C. and 5 tons pressure. The plaques were cooled and tested for color using a lab colorimeter. The heat build-up (expressed in HBU or heat build-up units in the table below) was determined using two methods. In the first method, samples were tested using a hot box affixed with a heat lamp as specified in ASTM D4803-10. Results for ASTM D4803-10 are calculated relative to a black control sample with an expected maximum outdoor temperature rise of 90° F. (approximately 32° C.) above ambient. The second method involved determining the outdoor heat build-up (OIR). In this method, samples were placed outdoors in horizontal exposure in Florida during mid afternoon. The samples were allowed to equilibrate for 2 hours and the surface temperature was determined with an IR gun. Outdoor exposure HBU was extrapolated relative to white and black controls. Per ASTM D4803-10, standard black HBU is 90° F. (approximately 32° C.) while that for standard white is 14.6° F. (approximately −10° C.).

TABLE 3

EXPERIMENTAL RESULTS

| Example | HBU ASTM (° F.) | HBU OIR (° F.) | L* |
|---|---|---|---|
| CE1 | 61 | 59 | 59.87 |
| CE2 | 57 | 68 | 39.98 |
| CE3 | 57 | 54 | 40.08 |
| CE4 | 50 | 15 | 95.25 |
| CE5 | 80 | 77 | 42.32 |
| CE6 | 90 | 90 | 25.81 |
| 1 | 55 | 43 | 64.74 |
| 2 | 55 | 32 | 69.23 |
| 3 | 55 | 46 | 42.28 |
| 4 | 54 | 44 | 44.35 |
| 5 | 56 | 39 | 43.73 |
| 6 | 53 | 21 | 52.63 |
| 7 | 44 | | 40.53 |
| 8 | 43 | | 36.62 |

Comparative example CE1 demonstrates the heat build-up characteristics of a composite containing a combination of infrared reflective colorants, but without the thermally emissive filler. CE2 and CE3 demonstrate the heat build-up characteristics of composites containing a combination of infrared reflective and infrared transparent colorants, but without the thermally emissive filler. CE4 and CE6 demonstrate the typical L* value and heat build-up properties of white and black colored specimens. CE5 illustrates the HBU values of a generally dark colored composite with L* values comparable to Examples 3, 4 and 5. Examples 1-8 demonstrate the use of the entire infrared reflective additive of this disclosure significantly reduces the surface temperature and heat build-up over articles not possessing the same additives but similar CIE L*a*b* characteristics.

Figure 2:
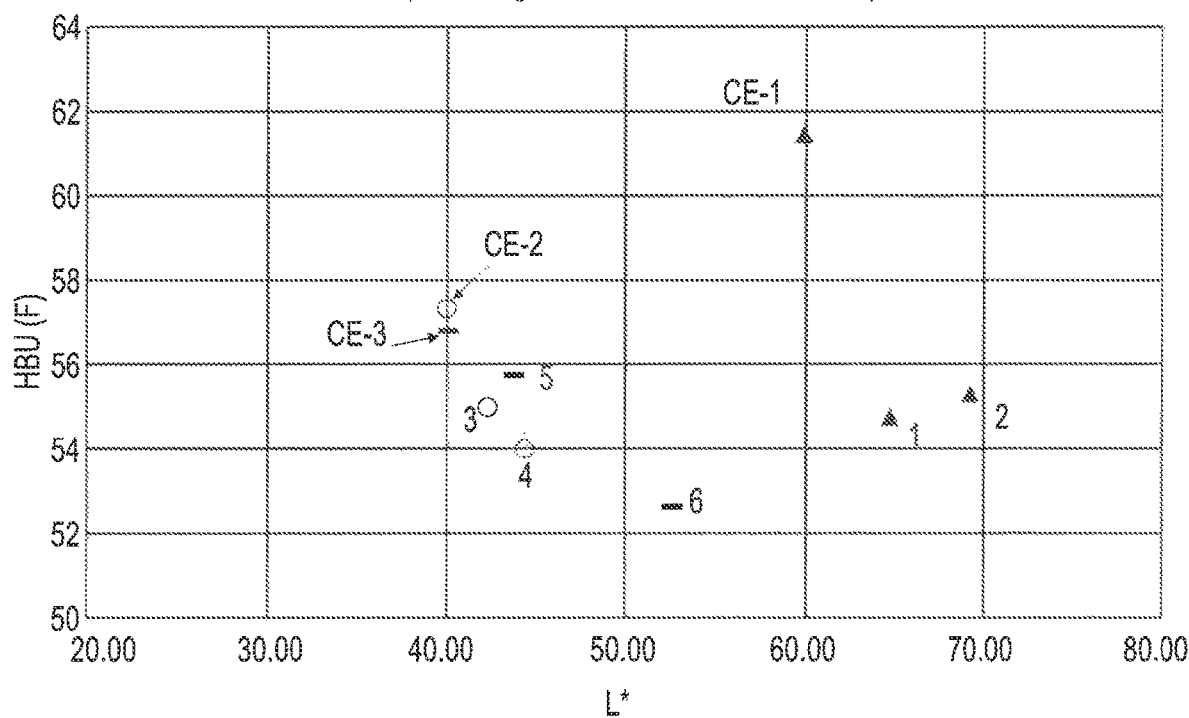
FIG. 2 is a plot of L* colorant values versus heat build-up values for several of the disclosed embodiments.
Figure 3:
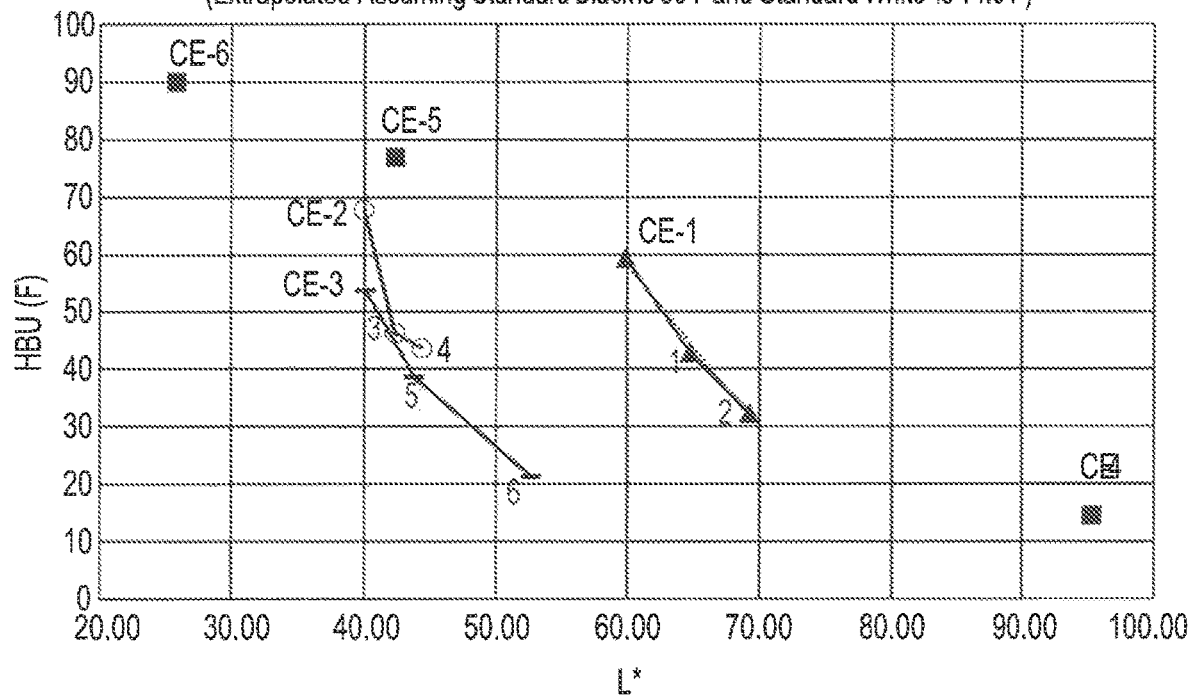
FIG. 3 is a graph of L* colorant values versus surface temperatures for several of the disclosed embodiments.

The reduction in heat build-up per ASTM D4803-10 for Examples 1-6 and Comparative Examples CE1-CE6 are illustrated in FIG. 2. FIG. 2 demonstrates that composites produced with the infrared reflective additive and similar colorants with closely related L* values exhibit lower HBU values. Similarly, FIG. 3 depicts a reduction in surface temperatures for composites with the infrared reflective additive over the Comparative Examples.

Although specific embodiments have been illustrated and described herein for purposes of description of the preferred embodiments, it will be appreciated by those of ordinary skill in the art that a wide variety of alternate or equivalent implementations calculated to achieve the same purposes may be substituted for the specific embodiments shown and described without departing from the scope of this disclosure. This application is intended to cover any adaptations or variations of the preferred embodiments discussed herein. Therefore, it is manifestly intended to only be limited by the claims and the equivalents thereof.

What is claimed is:
1. An article comprising:
   (a) a wood plastic composite core having a peripheral surface; and
   (b) a capstock bonded to at least a portion of the peripheral surface of the wood plastic composite core, wherein the capstock comprises a polymer matrix with an infrared reflective additive blended therein, the infrared reflective additive comprising one or more infrared reflective colorants and a thermally emissive filler, and
   wherein the infrared reflective colorant comprises an oxide of one or more of chromium, cobalt, gallium, indium, iron, lanthanum, lithium, manganese, molybdenum, neodymium, nickel, niobium, tin, and/or vanadium.

2. The article according to claim 1, wherein the polymer matrix comprises a polyethylene, a polypropylene, a polyolefin copolymer, a functionalized polyolefin, a polystyrene, a polystyrene copolymer, a polyacrylate, a polymethacrylate, a polyester, a polyvinylchloride, a fluoropolymer, a polyamide, a polyether imide, a polyphenylene sulfide, a polysulfone, a polyacetal, a polycarbonate, a polyphenylene oxide, a polyurethane, a thermoplastic elastomer, an epoxy, an alkyd, a melamine, a phenolic, a urea, a vinyl ester, or combinations thereof.

3. The article according to claim 1, wherein the polymer matrix comprises a crosslinkable polymer.

4. The article according to claim 1, wherein the capstock further comprises an organic or inorganic filler.

5. The article according to claim 1, wherein the article is a decking product, a fencing product, a railing product, a roofing product, or a siding product.

6. The article according to claim 1, wherein the capstock further comprises one or more infrared transparent colorants.

7. The article according to claim 1, wherein the thermally emissive filler is boron nitride.

8. The article according to claim 1, wherein the capstock has:
a heat build-up according to HBU (OIR) of less than 60° F.; and
a heat build-up according to HBU ASTM-D4803 of less than 60° F.

9. The article according to claim 1, wherein the capstock further comprises a white colorant comprising titanium dioxide and/or zirconium dioxide.

10. An article comprising:
(a) a wood plastic composite core having a peripheral surface; and
(b) a capstock bonded to at least a portion of the peripheral surface of the wood plastic composite core, wherein the capstock comprises a polymer matrix with an infrared reflective additive blended therein, the infrared reflective additive comprising one or more infrared reflective colorants and a thermally emissive filler, and
wherein the infrared reflective colorant comprises $Cr_2O_3$, $V_2O_3$, $Ga_2O_3$, $Fe_2O_3$, $Mn_2O_3$, $Ti_2O_3$, $In_2O_3$, $TiBO_3$, $NiTiO_3$, $MgTiO_3$, $CoTiO_3$, $ZnTiO_3$, $FeTiO_3$, $MnTiO_3$, $CrBO_3$, $NiCrO_3$, $FeBO_3$, $FeMoO_3$, $FeSn(BO_3)_2$, $BiFeO_3$, $AlBO_3$, $Mg_3Al_2Si_3O_{12}$, $NdAlO_3$, $LaAlO_3$, $MnSnO_3$, $LiNbO_3$, $LaCoO_3$, $MgSiO_3$, $ZnSiO_3$, $Mn(Sb,Fe)O_3$, or any combination thereof.

11. The article according to claim 10, wherein the capstock further comprises one or more infrared transparent colorants.

12. The article according to claim 10, wherein the thermally emissive filler is boron nitride.

13. The article according to claim 10, wherein the capstock has:
a heat build-up according to HBU (OIR) of less than 60° F.; and
a heat build-up according to HBU ASTM-D4803 of less than 60° F.

14. The article according to claim 10, wherein the capstock further comprises a white colorant comprising titanium dioxide and/or zirconium dioxide.

15. The article according to claim 10, wherein the polymer matrix comprises a polyethylene, a polypropylene, a polyolefin copolymer, a functionalized polyolefin, a polystyrene, a polystyrene copolymer, a polyacrylate, a polymethacrylate, a polyester, a polyvinylchloride, a fluoropolymer, a polyamide, a polyether imide, a polyphenylene sulfide, a polysulfone, a polyacetal, a polycarbonate, a polyphenylene oxide, a polyurethane, a thermoplastic elastomer, an epoxy, an alkyd, a melamine, a phenolic, a urea, a vinyl ester, or combinations thereof.

16. The article according to claim 10, wherein the polymer matrix comprises a crosslinkable polymer.

17. The article according to claim 10, wherein the capstock further comprises an organic or inorganic filler.

18. The article according to claim 10, wherein the article is a decking product, a fencing product, a railing product, a roofing product, or a siding product.

* * * * *